United States Patent [19]

Carty

[11] Patent Number: 4,775,121
[45] Date of Patent: Oct. 4, 1988

[54] CABLE CLAMP

[76] Inventor: James F. Carty, 31 Walter St., Lynn, Mass. 01902

[21] Appl. No.: 75,427

[22] Filed: Jul. 20, 1987

[51] Int. Cl.⁴ .............................................. F16L 3/22
[52] U.S. Cl. .................................... 248/68.1; 24/543; 248/74.3; 248/316.5; 403/381
[58] Field of Search ..................... 248/68.1, 67.5, 67.7, 248/73, 316.5, 74.3, 74.1, 74.2; 403/381; 24/543, 487

[56] References Cited

U.S. PATENT DOCUMENTS

| | | | |
|---|---|---|---|
| 3,713,622 | 1/1973 | Dinger | 24/543 X |
| 4,038,726 | 8/1977 | Takabayashi | 24/543 X |
| 4,114,241 | 9/1978 | Bisping | 248/68.1 X |
| 4,167,211 | 9/1979 | Haller | 248/68.1 X |
| 4,212,303 | 7/1980 | Nolan | 24/543 X |
| 4,264,047 | 4/1981 | Nelson | 248/74.1 X |
| 4,356,599 | 11/1982 | Larson et al. | 24/487 X |
| 4,623,102 | 11/1986 | Hough, Jr. | 24/543 X |
| 4,660,790 | 4/1987 | Muz | 248/67.7 X |
| 4,669,156 | 6/1987 | Guido | 248/74.3 X |

FOREIGN PATENT DOCUMENTS 0048301 1/1983 Japan ......................... 24/487

Primary Examiner—Ramon O. Ramirez
Attorney, Agent, or Firm—Owen J. Meegan; Aubrey C. Brine

[57] ABSTRACT

A plastic clamp is provided for attaching cables or wires to a wall. A support member and a retaining arm of substantially rigid material are co-extruded with, and connected by, a flexible hinge member at one end of said support member and arm. A plurality of fingers extend inwardly from said support member, toward said retaining arm, each forming a shelf surface for supporting a cable or the like, and the opposite end of said support member are detachably secured by a male connector on said arm having a plurality of flange surfaces disposed for interfitting engagement with a correspondingly shpaed female slotted opening in said support member.

13 Claims, 3 Drawing Sheets

CABLE CLAMP

BACKGROUND OF THE INVENTION

The present invention is directed to a plastic clamp and more particularly, to a plastic clamp of the type for retaining a plurality of cables, wires or the like in juxtaposition with one another adjacent a wall surface.

With the advent of an increased use of electrical or electronic devices, both in the work place and in the home, the number of cables, wires or the like which are necessary to connect various elements to a suitable outlet, or to interconnect the elements one to the other, has increased. A problem often arises when the number of cables and wires are confined to a small area where personnel are required to move about the units. It is obvious that the wires or cables would present a danger to personnel walking about the area if they were allowed to remain in haphazard orientation across the floor of a room where the various electronic units were in service and therefore, it is desirable to maintain the cables or wires in some orderly fashion and to fasten them securely to a vertical wall where they present no danger to foot traffic in the area.

It is also desirable in most instances where the wires or cables may be quite numerous to maintain the cables in juxtaposition with one another while keeping them separated, such that the wires and cables do not become twisted and may be readily identified when it is necessary to remove the particular cable to another position.

In the past, the need for devices which would accommodate a plurality of conduits or electrical conductors has not gone unnoticed, and various devices to accomplish the retaining of such members to a vertical surface have been proposed. One such device is disclosed in U.S. Pat. No. 3,421,187 to F. E. Rider issued on Jan. 14, 1969.

Although some of these devices have proved effective, there is still a need for a device which features the rigidity required to maintained cables, wires or the like firmly in lace, while allowing an operator to remove and install the cables or the like without requiring a second person to aid in the operation. In many of the prior art devices, the choice of material must be made such that a rigid structure is provided for maintaining the cables adjacent the wall structure and separated one from the other, while providing a material which is flexible enough to provide for hinged portions or retaining elements which are required to flex in order to fasten the structures in place. The choice of material must of necessity, therefore, be one of compromise. In addition, many of the devices are formed such that an operator would require the assistance of another person in order to assemble the cables into the clamp or to remove an element from the clamp, when the clamp is retained onto a wall or other surface.

It is therefore an object of the present invention to provide a clamp for retaining a plurality of cables or the like adjacent the wall surface which provides a rigid and firm clamping action on the cables when assembled into the clamp and provides a flexibility thereby allowing access to the cables within the clamp when desired.

Another object of the invention is to provide a clamp for retaining a plurality or cables or the like adjacent a wall surface which is easily accessible and which allows for removal of the cables from, or assembly of the cables into the clamp by a single operator, that is the clamp may be swung open about an axis around a hinge and snapped closed about an axis normal to the swinging motion that is used to open it.

Yet another object of the invention is to provide a plastic clamp of the type described which is so designed and constructed as to be mass produced by co-extruding a plurality of plastic materials.

SUMMARY OF THE INVENTION

The above objects and other objects which will be apparent as the description proceeds are achieved by providing a plastic clamp for retaining a plurality of cables or the like adjacent a wall surface which comprises an elongated support member having an outer surface for contacting the wall surface and an elongated retaining arm disposed in spaced relation with the support member. A hinge member rotatable on the X, Y and Z axes connects one end of the support member with one end of the arm. The hinge member is formed of a plastic material having a greater flexibility than the material of the support member and the material of the arm. At the opposite end of the support member and the arm from that of the hinge, fastening means is disposed for detachably engaging the arm with the support member and means are disposed on the inner surface of the support member for supporting a cable or the like between the support member and the retaining arm.

The clamp is a unitary element formed by a process of coextruding one plastic material to form the support member and the retaining arm simultaneously with a separate plastic material having a greater flexibility than the one material to form the hinge member.

BRIEF DESCRIPTION OF THE DRAWINGS

The foregoing and other features of the invention will now be described in connection with an illustrated embodiment, and with reference to the accompanying drawings wherein.

DESCRIPTION OF THE PREFERRED EMBODIMENT

Figure 1:
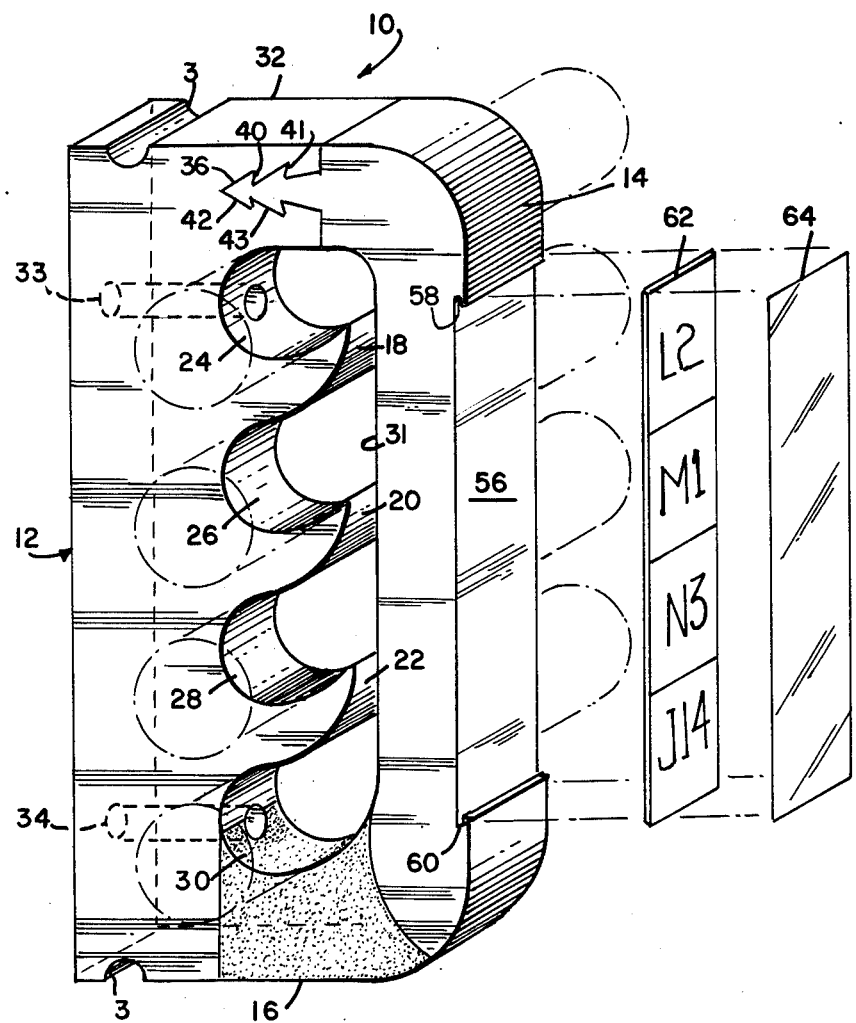
FIG. 1 is an elevational perspective exploded view showing elements of the disclosed cable clamp in detail, the clamp being depicted in the closed position to retain a plurality of cables (shown in phantom lines).
Figure 2:
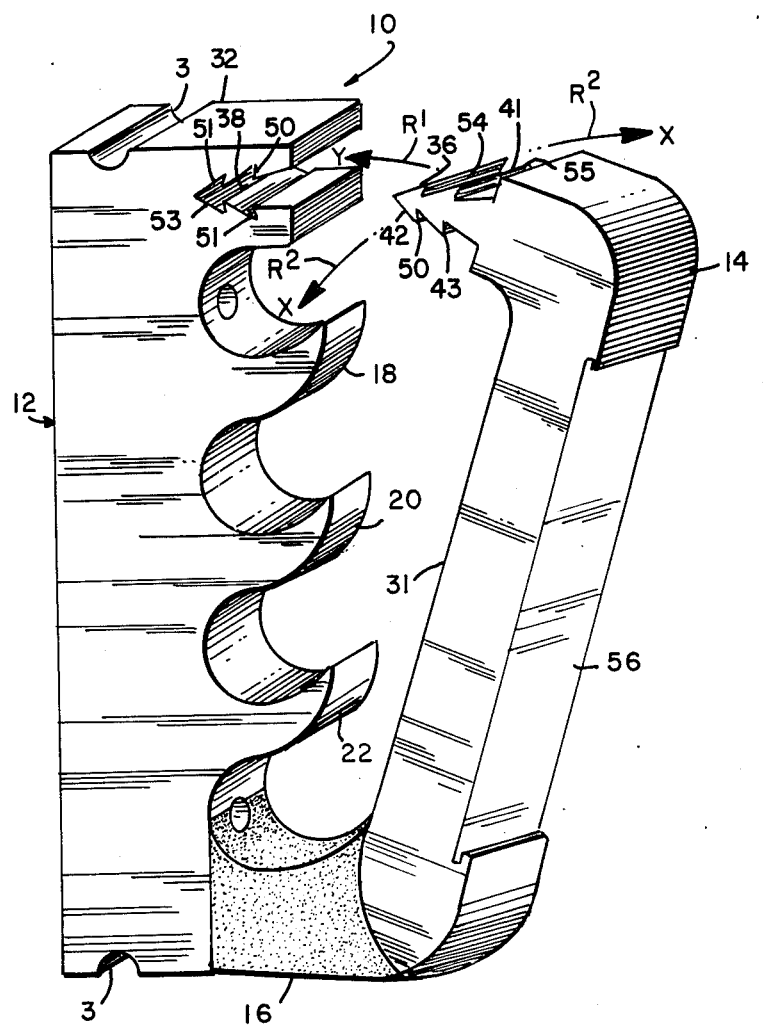
FIG. 2 is an elevational perspective view similar to FIG. 1 showing the cable clamp of FIG. 1 in the open position to receive the cables shown in FIG. 1.

Referring now to FIGS. 1 and 2, there is shown a plastic clamp 10 which is to be employed for retaining a plurality of cables or the like adjacent a wall or other surface. The clamp 10 is formed as a unitary structure and comprises portions which are defined as support member 12 and a retaining arm 14 interconnected one to the other by a hinge member 16. The support member 12 and the retaining arm 14 are constructed of similar material which is sufficiently rigid to support the weight of cables or other devices to be held within the clamp 10, while that portion designated as the hinge 16 is fabricated of a more flexible material which will be explained in detail as the description proceeds.

The support member 12 is shown to have a plurality of fingers 18, 20 and 22 which extend from the inner surface of the support member 12 toward the retaining arm 14. As best shown in FIG. 1, the fingers 18, 20 and 22 extend over substantially the entire distance between the support member 12 and the retaining arm 14 in the closed position. The cables are held in place on the fingers 18, 20, and 22 by an inner surface 31 of clamp arm 14. In order to freely support a cable or other cylindrical member, each of the fingers 18, 20 and 22, as well as the upper surface of the hinge 16, are provided with arcuate surfaces 24, 26, 28 and 30, respectively, which serve as a shelf surface for retaining a cable, conduit or other cylindrical member thereon during placement of the cables into the clamp 10. While the embodiment shows three fingers forming four openings provided for the cable, it should be understood that the clamp 10 may be modified to accommodate any number of cables by the addition of other finger members similar to finger members 18, 20 and 22.

At the end of the support member 12 opposite the hinge 16, an extension protrudes outwardly to provide engaging means for the retaining arm 14. The retaining arm 14 extends in spaced relation with the support member 12 and is provided with a substantially planer surface 34 which serves to combine with the fingers 18, 20 and 22 to form a plurality of separated cavities in the clamp 10, each of which will accommodate a cable or the like, the cable elements being separated one from another and substantially supported by the fingers 18, 20 and 22. Detachable engaging means in the form of an elongated locking member 36 is provided at the end of the retaining arm 14 opposite the hinge and a slotted opening 38 is formed in the support member 12 to accommodate the locking member 36. The locking member 36 is substantially wedged-shaped having a plurality of barb elements 40, 41, 42 and 43. The slotted opening 38 is formed such that the opening conforms to the shape of the locking member in profile, that is, the opening 38 is of wedged-shape and contains a plurality of barbed shaped openings formed in the support member 12. The barbed-shaped portion of the slotted opening is provided with a plurality of locking surfaces 50, 51, 52 and 53 for interlocking engagement with a plurality of mating surfaces 54, 55, 56 and 57 formed on the locking member 36. Each of the locking surfaces 50, 51, 52 and 53, and the mating surfaces 54, 55, 56 and 57 lies substantially in a plane which would be parallel to the imaginary center line of the arc describing the arcuate surfaces 24, 26, 28 and 30. Through the use of the interlocking relationship as described, the barbs of locking member 36 can be snapped into opening 38 by striking retaining arm 14 with the heel of the hand to produce the motion $R^1$ and can be opened by grasping the retaining arm 14 and twisting to produce the motion $R^2$. In this way, the opening and the closing of the clamp will occur on axes that are normal to each other so that only one person is needed to do the work and the support member 12 needs not to be removed from the wall to do it. The locking and mating surfaces are therefore in alignment with a cable or cables being supported by the plastic clamp 10.

Referring to FIG. 1, it will be observed that the outer surface of the retaining arm 14 is provided with a recessed surface 56 extending from adjacent one end of the arm to a point adjacent the opposite end of the arm. The recessed surface 56 terminates at either end with V-shaped undercuts 58 and 60 extending transversely across the width of the arm 14. An indicia bearing elongated sheet 62 is provided with substantially the same dimensions as the recess surface 56 and a clear plastic cover sheet 64 of the same dimensions as the indicia bearing sheet 62 is provided for protection of the indicia bearing sheet when the two are assembled by sliding the sheets into the V-shaped undercuts 58 and 60. The indicia bearing sheet 62 may take any form which is advantageous to identify the cables or wires at the various locations within the clamp 10. As is evident, the indicia bearing sheet 62 may be replaced when the cables are changed in position, or may be such that the indicia itself may be erased and a new designation indicated on the sheet 62.

Figure 3:
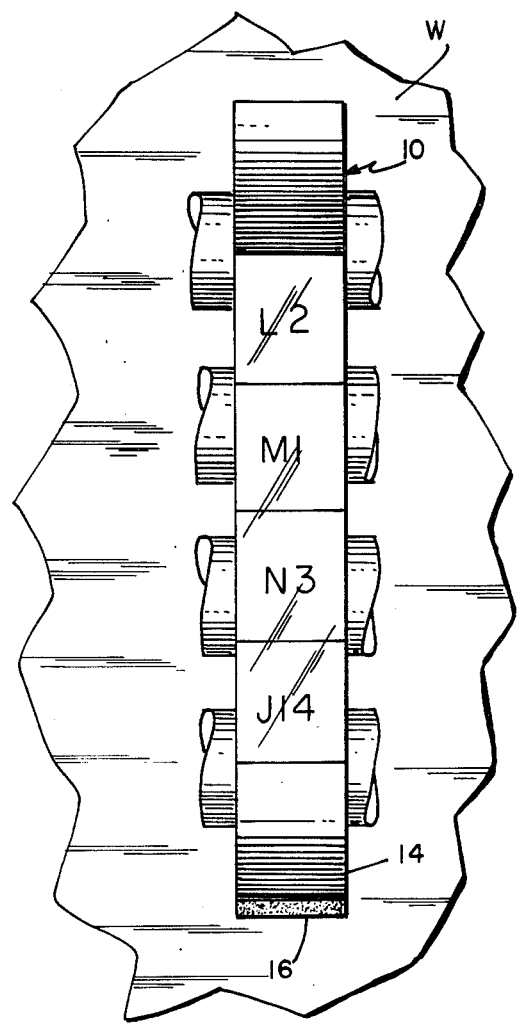
FIG. 3 is a front elevational view showing the cable clamp of FIGS. 1 and 2 mounted on a wall surface and retaining a plurality of cables adjacent the wall.

Referring now to FIGS. 3 taken in conjunction with FIGS. 1 and 2, the plastic clamp 10 is shown to be employed in retaining four cables adjacent a wall W. The clamp 10 may be fastened by any suitable fastening means such as wood screws or metal piercing fasteners extending through the holes 33 and 34 provided in the support member 12. If desired, for applications where bus-bars are conveniently located for mounting, small recesses may be placed near the top and the bottom of the support member 12 to enable an installer to snap the plastic clamp into place without the placement of screws or the use of adhesives. Additionally, the wall facing surface of the support member 12 may be provided with a tape having adhesive on both sides which would serve to retain the clamp in contact with the wall W.

With the clamp 10 in the position shown in FIG. 2, that is, in the open position, the cables may be dropped into the opening between the support member 12 and the retaining arm 14 and retained on the arcuate surfaces 24, 26, 28 or 30 prior to closing the retaining arm to the position shown in FIG. 1. That is to say, with the clamp 10 retained on the wall W, an operator may place the cables one at a time on the arcuate surfaces 24, 26, 28 and 30 without having to close the retaining arm 14 to the position shown in FIG. 1 in order to retain the cables in place. Thus, a single operator may remove or insert cables into the clamp without the aid of another person to hold the cables in place while the retaining arm is being placed in engagement with the support member. Placement of the retaining arm 14 in the support member 12 may be accomplished by urging the barbs 40, 41, 42, and 43 in a direction normal to the direction of the cables disposed on the faces 24, 26, 28, and 30, although the motion described hereinafter with reference to removal of the cables from clamp 10 can be used also. In some cases, where the plastic clamp is subjected to vibration, it may be desirable to drill a hole through the box 32 and the locking member 36 (when it is in place) so that a fastener or cotter pin (not shown) can be inserted to retain the two parts together.

When it becomes necessary to remove the cables from the clamp 10, the flexibility provided by the hinge 16 enables the operator to move the retaining arm in a side-wise direction or along the direction of the locking surfaces 50, 51, 52 and 53 to a position where the locking member 36 is no longer in engagement with the slotted opening 38. This is accomplished due to the flexibility of the hinge 16 in both the opening and closing motion of the retaining arm 14 and a motion at right angles to the opening and closing motion of the retaining arm. Thus, the plastic clamp may be opened and closed many times without damage to the engagement means or to the hinge 16.

In manufacture of the plastic clamp 10, a process of coextrusion of a pair of dual durometer materials is employed such that the hinge 16 is of a more flexible material than the support member 12 and the retaining arm 14. Dual durometer extrusion is an application that is well established in the art of PVC extrusion providing an extending profile combining plasticized and unplasticized PVC in one extrusion with a permanent bond between the different hardness materials.

For ease in processing, dual-Durometer extrusion is done at low shear, low-temperature conditions. It is important that the flexible material be sheared and heated sufficiently to assure a complete melt. Generally, fused pellet or cube compound is used because of its convenience in getting physical properties without a large amount of work in the extruder.

Two extruders are required for the process, one for each material and if the flexible portion of the extrusion is small, the second extruder can be relatively small. There are small single-screw extruders made for such applications; they have the flexibility to be mounted in planes other than horizontal and at approach angles to the die which are convenient or conserve space. Machines of this type are well known in the plastic manufacturing industry.

The extrusion die is basically one in which both materials are shaped independently, but an unplasticized melt enters the die almost at the exit point of the die. There is sufficient time in the die to form a fused permanent bond between the two hardness materials.

These profiles are handled downstream in a fashion similar to that used with other profile extrusions.

As coextrusion has been practiced in many forms and dual-durometer extrusion, as discussed, uses coextrusion principles, it is considered that further discussion of the process is not necessary to enable one skilled in the art to produce the clamp 10, employing these techniques.

As will be noted from the drawing, all of the surfaces provided to the clamp 10 are in alignment with an imaginary line of a cylindrical item such as a cable to be held within the clamp, or at right angles thereto. Thus, the clamp lends itself to the extrusion process wherein a length of material in the shape of a clamp may be extruded in the direction of the imaginary center line described, and a plurality of clamps formed by cutting desired width of clamp for each clamp to be manufactured. The width of the individual clamps that are cut from the extrusion must be such that the locking member can move freely within the locking surfaces without undue binding or prevention of the rotational motion.

The materials which may be employed in extruding the clamp 10 may be vinyls or PVC. A PVC material may be used and the hinge 16 may be of the same PVC material, however employing a compatible PVC plasticizer to soften the plastic to be employed at the hinge, the principal criteria of the hinge being that it is more flexible then the adjacent clamp members and be capable of rotation about an axis normal to the cables supported by the support member 12.

Having thus described my invention and what I claim as new and desire to secure as Letters Patent of the United States is

1. A plastic clamp for retaining a plurality of cables or the like adjacent a wall surface comprising:
    an elongated support member having an outer surface for contacting said wall surface;
    an elongated retaining arm disposed in spaced relation with said support member;
    a hinge member interconnecting one end of said support member with one end of said arm, said hinge member being formed of a plastic material having greater flexibility than the material of said support member and the material of said arm;
    means disposed at the opposite end of said support member and the opposite end of said arm for detachably engaging said arm with said support member, said engaging means providing engagement of said arm with said support member by movement in a direction substantially perpendicular to the plane of said support member outer surface and providing disengagement of said support member through movement in a direction substantially parallel to the plane of said support member outer surface through flexure of said hinge member.

2. A plastic clamp as set forth in claim 1 wherein said clamp is a unitary element formed by a process of coextruding one plastic material to form said support member and said retaining arm simultaneously with a separate plastic material having a greater flexibility than said one material to form said hinge member.

3. A plastic clamp as set forth in claim 1 wherein said hinge establishes a pair of axes of rotation of said arm relative to said member a first axis employed during movement to engage said arm with said support member and a second axis employed during movement to disengage said arm with said support.

4. A plastic clamp as set forth in claim 1 wherein said means for supporting a cable or the like between said support member and said retaining arm comprises a plurality of fingers extending from the inner surface of said support member toward said retaining arm, each of said fingers having an arcuate surface facing upwardly to form a shelf surface of sufficient magnitude to support a cable thereon whereby a cable is supported on said shelf surface in parallel relation to said wall, and said retaining arm inhibits movement of said cable in a direction away from said inner surface of said support member when said arm is engaged with said support member.

5. A plastic clamp as set forth in claim 4 wherein said means for detachably engaging said arm with said support member comprises a wall structure forming a slotted opening in said support member having a locking surface substantially in alignment with an imaginary centerline of the arc describing said arcuate surface; and
    an elongated locking member projecting from said retaining arm toward said support member, said locking member having a mating surface for contacting said locking surface with said member extending into said slotted opening whereby said locking member is removable from said slotted opening by relative motion between said member and said slotted opening in the direction of said imaginary centerline.

6. A plastic clamp as set forth in claim 4 wherein said locking member is in the form of a wedge having a plurality of mating surfaces formed thereon; and
    said slotted opening is formed to conform to the shape of said wedge in profile.

7. A plastic clamp as set forth in claim 5 wherein said clamp is a unitary element formed by a process of coextruding one plastic material to form said support member and said retaining arm simultaneously with a separate plastic material having a greater flexibility than said one material to form said hinge member.

8. A plastic clamp as set forth in claim 1 wherein an outer surface of said retaining arm has a recessed surface thereon extending from adjacent said hinge member to adjacent said opposite end of said arm, said recessed surface terminating in a V-shaped undercut formed in said outer surface transversely of said retaining arm at each end of said recessed portion;

and an indicia bearing elongated sheet of substantially equal dimensions to that of said recessed surface, disposed on said recessed surface and retained thereon at either end by interfitting engagement in said V-shaped undercuts whereby cables or the like retained in said clamp are readily identified.

9. A plastic clamp for retaining a plurality of cables or the like adjacent a wall surface comprising;

an elongated support member having an outer surface for contacting said wall surface;

an elongated retaining arm disposed in spaced relation with said support member;

a hinge means interconnecting said support member and said arm, said hinge member being integrally united to said support member and said arm, said hinge means further being rotatable on a pair of perpendicular axes, one axis disposed substantially perpendicular to said support member outer surface and the other axis disposed substantially parallel to said support member outer surface;

means disposed at the opposite end of said support member and the opposite end of said arm for detachably engaging said arm with said support member; and means disposed on the inner surface of said clamp for supporting a cable or the like between said support member and said retaining arm.

10. The plastic clamp according to claim 9 wherein the means for detachably engaging said arm with said support member includes means to open and to close the clamp on said axes that are respectively normal to each other.

11. A plastic clamp for retaining a plurality of cables or the like adjacent a wall surface comprising:

an elongated support member having an outer surface for contacting said wall surface;

an elongated retaining arm disposed in spaced relation with said support member;

a hinge member connecting the lower end of said retaining arm to the lower end of said support member, said hinge member being formed of a plastic material having greater flexibility than the material of said support member and the material of said arm;

a plurality of fingers extending from the inner surface of said support member toward said retaining arm, each of said fingers having an arcuate surface facing upwardly to form a shelf surface of sufficient magnitude to support a cable thereon;

means disposed on the upper end of said support member and the uper end of said retaining arm for detachably engaging said arm with said support member comprising wall structure forming a slotted opening in said support member having a locking surface substantially in alignment with an imaginary centerline of the arc describing said arcuate surface; and an elongated locking member projecting from said retaining arm toward said support member, said locking member having a mating surface for contacting said locking surface with said member extending into said slotted opening whereby said locking member is engagable in said slotted opening by relative motion between said member and said slotted opening in a direction perpendicular to said imaginary centerline and is removable from said slotted opening by relative motion between said member and said slotted opening in the direction of said imaginary centerline.

12. A plastic clamp as set forth in claim 11 wherein in said hinge member establishes the axis of rotation of said retaining arm relative to said support member.

13. A plastic clamp as set forth in claim 11 wherein said locking member is in the form of a wedge having a plurality of mating surfaces formed thereon and said slotted opening is formed to conform to the shape of said wedge in profile.

* * * * *